No. 811,422. PATENTED JAN. 30, 1906.
A. C. MENGES.
FRICTION CLUTCH.
APPLICATION FILED JAN. 19, 1905.
2 SHEETS—SHEET 2.
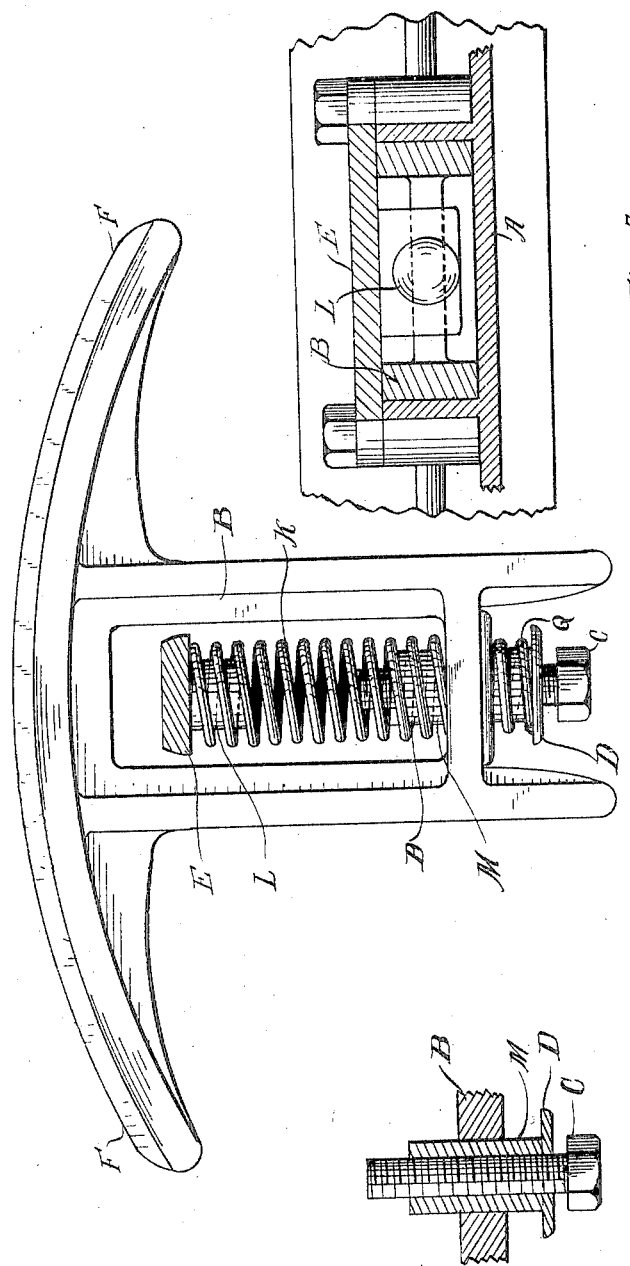
Witnesses
Edward R. Monroe.
Mary S. Tooker
Inventor
Albert C. Menges
by Edward Taggart
Attorney

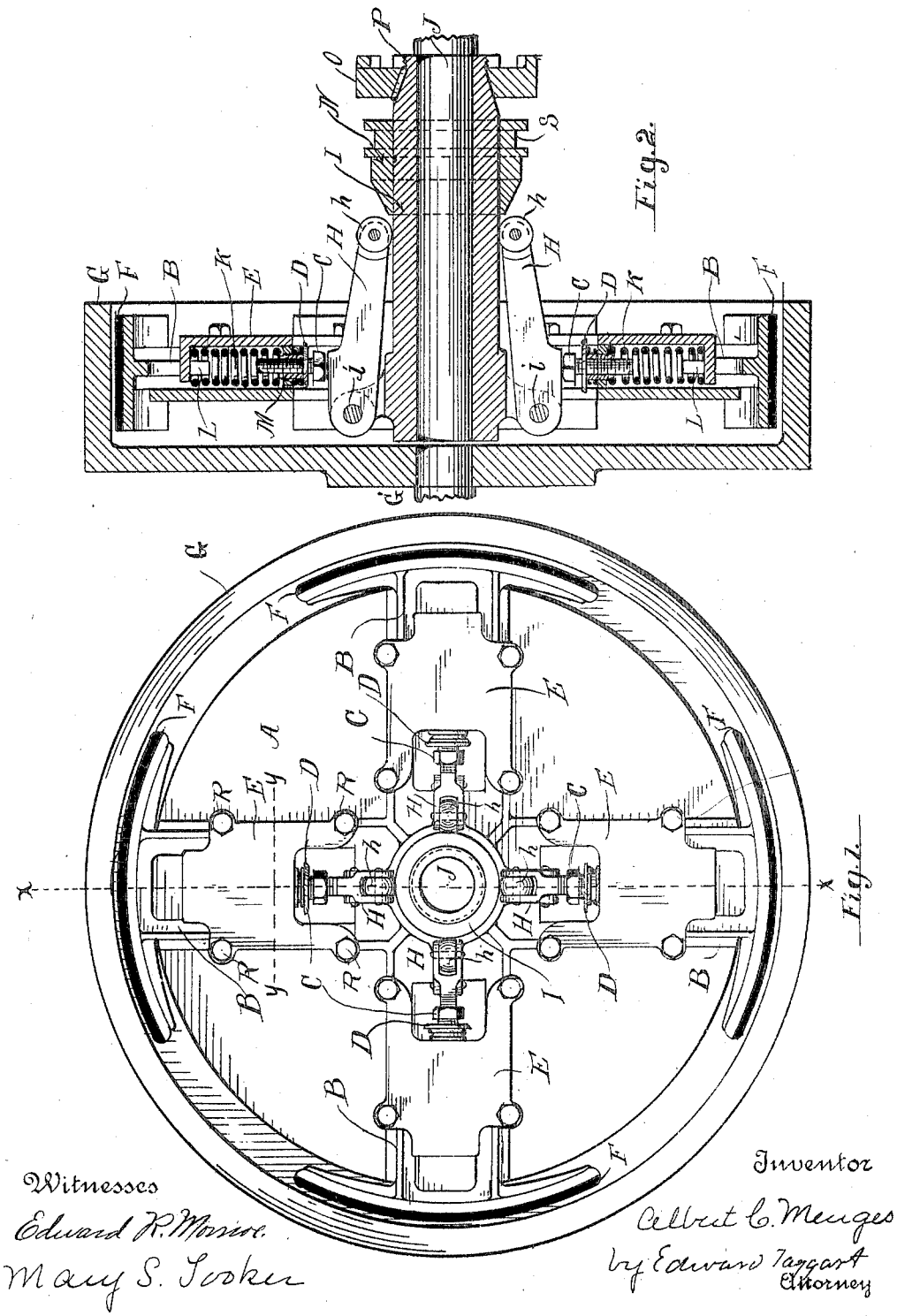

UNITED STATES PATENT OFFICE.

ALBERT C. MENGES, OF GRAND RAPIDS, MICHIGAN, ASSIGNOR TO WILLIAM HARRISON, OF GRAND RAPIDS, MICHIGAN.

FRICTION-CLUTCH.

No. 811,422.

Specification of Letters Patent.

Patented Jan. 30, 1906.

Application filed January 19, 1905. Serial No. 241,843.

*To all whom it may concern:*

Be it known that I, ALBERT C. MENGES, a citizen of the United States, residing at Grand Rapids, in the county of Kent and State of Michigan, have invented new and useful Improvements in Friction-Clutches, of which the following is a specification.

This invention relates to certain new and useful improvements in friction-clutches, and especially relates to clutches adapted for use in automobiles and analogous purposes.

The invention consists in the combination and arrangement of parts hereinafter described and claimed.

The objects of the invention are, first, to furnish a positive and efficient clutch for engaging and disengaging the mechanism operated from the main shaft or other power; second, to furnish a clutch supported in such a manner that it may be easily accessible in case the same should become inoperative; third, to furnish a clutch that can be readily and quickly applied; fourth, the combination of certain parts for the purpose of making the clutch adjustable. These objects I accomplish by means of the mechanism illustrated in the accompanying drawings, in which—

Figure 1 shows a side elevation of a clutch constructed in accordance with my invention provided with four frictional surfaces, each surface supported by movable arms, which arms are secured by adjustable caps in the shell or case. Fig. 2 is a sectional view of the same on line $x\ x$ of Fig. 1, showing a section of two of the friction-clutches and the arrangement of the springs which operate them, also a section of the stationary collar and sliding sleeve which operates the clutches engaging with the levers H H, &c. Fig. 3 is a detail view of one of the clutch-arms, showing the same partially in section and illustrating the spring arrangement for holding the clutch out of engagement with the wheel G. Fig. 4 is a detail sectional view of the sliding collar M. Fig. 5 is a sectional view on line $y\ y$ of Fig. 1, showing one of the caps.

Similar letters refer to similar parts throughout the several views.

A represents the main case or plate, which carries all the clutches which are movable with the shaft J.

B B B B are the clutch-arms. These arms are placed radially with reference to the shaft J and are supported by means of a collar I, which is rigidly attached to the shaft J.

C C C C are the nuts for adjusting the length of the arms which carry the frictional surfaces.

D D D D are the abutments for the small springs Q on the sliding collar M.

E E E E are removable caps, which are adapted to hold the sliding arms in place. These caps are secured by means of nuts shown by R R R R. These nuts engage with bolts which are firmly attached to the case A, and by removing the nuts R, &c., the caps E, &c., may be removed, and all parts of the clutch are then accessible and the clutch may be readily removed, replaced, or repaired, as may be required.

Each arm is covered with a frictional covering or frictional surfaces F F, which frictional surfaces are placed at the extreme ends of the arms and engage with the inner periphery of the wheel G, which in the example of my invention illustrated in the drawings is shown as a fly-wheel. The fly-wheel G is rigidly mounted upon the shaft G', the shaft G' representing the main shaft of the engine or any other shaft conveying the power.

H H H H represent levers, which are used to press outwardly the clutch-arms, each lever engaging with a nut C or any other suitable abutment carried by the arms. Each lever H is pivoted at the point $i$ and preferably carries an antifriction-roller $h$.

N is a sliding sleeve mounted upon the stationary collar I and provided with a beveled portion which is adapted to engage with the roller $h$, and when said sleeve is driven so as to separate the said rollers from the stationary collar I the arms of the clutch are pressed outwardly, so as to engage the frictional surfaces F with the inner periphery of the clutch-wheel G.

O is a stationary clutch on the extended portion I, adapted to engage with the transmission-gear and is held in place by the nut P. This clutch may be made in any suitable form and needs no further description, as it forms no part of my invention.

K is a long spring used for holding the frictional surfaces F out of engagement with the fly-wheel and to return the same to normal position and out of engagement when released by the action of the levers H.

L L L L are pins attached to the cap E for retaining the springs in position, the same being more fully shown in Fig. 3.

Q Q Q Q are the adjusting-springs for adjusting the tension between the fly-wheel and the frictional surfaces F.

S is a groove in the collar N, furnishing suitable means for engagement with the lever or other device for giving a longitudinal movement to the collar N for the purpose of operating the levers H, and thereby extending the arms of the friction-clutches out.

By the construction above described the clutches may be removed from the case by merely detaching the caps E, so that the clutch is at all times readily accessible without disturbing any part of the mechanism. By the use of the spring K the arms are retracted so as to disengage the frictional surfaces F when the clutch is not in engagement, and by the use of the spring Q is produced a yielding pressure between the frictional surfaces F and the clutch-wheel, thereby making the clutch self-adjusting and greatly increasing the utility of the clutch.

In the example of my invention shown in the drawings I have described and shown four sliding arms, each bearing a frictional surface; but it will be understood that the number of these may be varied. It will also be understood that the springs may be supported in any suitable manner, as I do not wish to limit myself to the specific form of construction.

Having thus described my invention, what I claim to have invented, and desire to secure by Letters Patent, is—

1. In a friction-clutch, the combination with a case and a clutch-wheel, of a plurality of radially-movable clutch-arms, a corresponding series of removable caps forming guides for the arms and having outer angular extremities, springs held between the angular extremities of the caps and the inner extremities of the arms, radially-slidable sleeves movable in the inner extremities of the springs and through the inner ends of the arms and having auxiliary spring-controlling devices independent of the first-mentioned springs interposed between the caps and the arms, and also adjusting means for regulating the clutch-arms, and means engaging portions of the said sleeves for throwing the arms outwardly.

2. In a friction-clutch, the combination with a case and clutch-wheel, of a plurality of radially-movable clutch-arms, springs for retracting the said arms, levers for extending the arms into engagement with the clutch-wheel, means for retaining the arms in position, and slidable devices coöperating with the inner extremities of the arms and engaged by the levers, the inner slidable devices having springs engaging the same and independent of the springs for retracting the arms.

3. In combination with a clutch-wheel, of a plurality of slidable arms extending radially from a common center, means for throwing the said arms outwardly to cause engagement of the outer ends thereof with the clutch-wheel, a spring for each arm coöperating with the inner extremity of the latter to give a yielding pressure between the frictional surface of the arm and the clutch-wheel, a slidable element for each arm located at the inner end of the latter and coöperating with the pressure-controlling spring and having a device longitudinally adjustable therein to regulate the outward throw of the arm and contacting with the means for throwing the said arms outwardly, and a spring coöperating with the device adjustable longitudinally in the slidable element and independent of the spring for each arm for disengaging the arm from the clutch-wheel when outward pressure on said arm is removed.

4. The combination with a clutch-wheel and case, of a plurality of arms held by the case and radially movable with respect to a common center, caps secured to the case over the inner extremities of the arms to serve as guides for the latter and having outer angular extremities with inward projections, sleeves slidably mounted in the inner terminals of the arms and having adjusting means projecting therefrom and springs to give a yielding pressure thereto, retracting-springs for the arms interposed between the projections of the caps and the outer extremities of the sleeves and independent of the first-named springs, and movable elements engaging the adjusting means carried by the sleeves.

In testimony whereof I have hereunto set my hand in presence of two subscribing witnesses.

ALBERT C. MENGES.

Witnesses:
EDWARD TAGGART,
MARY S. TOOKER.